US00RE43055E

(19) United States
(12) Reissued Patent
Takeuchi

(10) Patent Number: US RE43,055 E
(45) Date of Reissued Patent: Jan. 3, 2012

(54) PERMANENT MAGNET TYPE GENERATOR

(75) Inventor: Norikazu Takeuchi, Handa (JP)

(73) Assignees: Denso Corporation, Kariya (JP); Denso Trim Co., Ltd., Mie-gun (JP)

(21) Appl. No.: 12/585,352

(22) Filed: Sep. 11, 2009

Related U.S. Patent Documents

Reissue of:
(64) Patent No.: 7,268,450
Issued: Sep. 11, 2007
Appl. No.: 11/234,210
Filed: Sep. 26, 2005

(30) Foreign Application Priority Data

Sep. 29, 2004 (JP) ..... 2004-284276
Jun. 24, 2005 (JP) ..... 2005-184572

(51) Int. Cl.
*H02K 1/27* (2006.01)
*H02K 1/06* (2006.01)
*H02K 1/16* (2006.01)
*H02K 21/22* (2006.01)

(52) U.S. Cl. .. 310/52; 310/74; 310/156.21; 310/156.28; 310/216.114

(58) Field of Classification Search ..... 310/52, 310/74, 156.08, 156.21, 156.28, 162, 216.023, 310/216.114
See application file for complete search history.

(56) References Cited

U.S. PATENT DOCUMENTS 3,663,850 A 5/1972 Phelon
5,170,083 A 12/1992 Burgbacher
6,396,177 B1 * 5/2002 Shin et al. ..... 310/63
6,573,629 B1 6/2003 Morimatsu
7,271,517 B2 9/2007 Uemura et al.
7,514,834 B2 4/2009 Takeuchi
2001/0006292 A1 7/2001 Inaba et al.
2002/0047338 A1 * 4/2002 Uemura et al. ..... 310/51
2003/0197442 A1 * 10/2003 Baba ..... 310/156.26
2004/0090136 A1 5/2004 Uemura et al.
2004/0140725 A1 7/2004 Takahashi
2005/0236916 A1 * 10/2005 Uemura et al. ..... 310/58

FOREIGN PATENT DOCUMENTS

JP U-H06-031348 4/1994
JP A-2002-204560 7/2002
JP A-2003-088027 3/2003
JP A 2003-348784 5/2003

(Continued)

OTHER PUBLICATIONS

Japanese Patent Office, Notice of Reason for Refusal mailed Dec. 15, 2009 in Japanese Patent Application No. 2005-184572 w/English-language Translation.

(Continued)

*Primary Examiner* — Tran Nguyen
(74) *Attorney, Agent, or Firm* — Oliff & Berridge, PLC

(57) ABSTRACT

A permanent magnet type generator includes a rotor having 4n (n is a positive integer) permanent magnet poles disposed in a circumferential direction of the rotor to have circumferential gap between adjoining poles and a stator that has 3n teeth and coils wound around the teeth. The stator core includes a pair of core end plates and a laminate core disposed between the core end plates. Each core end plate has a circumferential width that relates to the gap distance at portions opposite the permanent magnet poles.

18 Claims, 11 Drawing Sheets

FOREIGN PATENT DOCUMENTS

| | | | |
|---|---|---|---|
| JP | A-2004-088954 | | 3/2004 |
| JP | A 2004-88955 | | 3/2004 |
| JP | A-2004-166381 | | 6/2004 |
| JP | 2006136080 A | * | 5/2006 |
| JP | A 2006-136080 | | 5/2006 |

OTHER PUBLICATIONS

U.S. Appl. No. 10/983,028, filed Nov. 8, 2004, Takeuchi.

* cited by examiner

PERMANENT MAGNET TYPE GENERATOR

Matter enclosed in heavy brackets [ ] appears in the original patent but forms no part of this reissue specification; matter printed in italics indicates the additions made by reissue.

CROSS REFERENCE TO RELATED APPLICATION

The present application is based on and claims priority from Japanese Patent Applications 2004-284276, filed Sep. 29, 2004, and 2005-184572, filed Jun. 24, 2005, the contents of which are incorporated herein by reference.

BACKGROUND OF THE INVENTION

1. Field of the Invention

The present invention relates to a permanent magnet type generator to be mounted on a motor cycle, a beach buggy, a snowmobile or the like and, particularly, a generator that includes a rotor having 4n rare-earth permanent magnet poles and a stator having 3n teeth, wherein n is a positive integer.

2. Description of the Related Art

Recently a permanent magnet type generator is required to increase power in a lower speed range without increasing the axial size of the generator. However, it has been very difficult for a conventional permanent magnet type that includes a rotor having 2n rare-earth permanent magnet and a stator having 3n teeth.

JP-A-2003-348784 discloses a generator that includes a rotor having 4n rare-earth permanent magnet poles and a stator having 3n teeth around which stator coils are wound. The stator is comprised of a pair of thick core end plates and laminated thin core sheets sandwiched between the core end plates. Each core end plate has an upright flange portion at the periphery of the stator to face the inside surface of the rotor. Because the flange portion holds the stator coil and introduces effective magnetic flux of the permanent magnetic poles, the end core plate has a thickness sufficient to hold the coils and to introduce the magnetic flux.

Although the disclosed generator aims to meet the above stated requirement, the air gap between adjoining permanent magnet poles becomes so small that it suffers a considerable amount of eddy current loss on the core end plate because a ineffective portion or a leakage of the magnetic flux of the permanent magnet poles flows through the upright flange portions. Such an amount of the eddy current loss excessively heats the stator coils to damage the insulation coatings on the coils.

JP-A-2004-88955 discloses another generator that includes a rotor having 4n rare-earth permanent magnet poles and a stator having 3n teeth. However, the thick core end plates of the stator do not have upright flange portions. Therefore, it is difficult to hold the same size of the stator coils around the teeth. In other words, it is difficult to increase electric power in a lower speed range.

SUMMARY OF THE INVENTION

Therefore, an object of the invention is to provide an improved permanent magnet type generator.

Another object of the invention is to provide a compact and powerful permanent magnet type generator that reduces eddy current loss.

According to a feature of the present invention, a permanent magnet type generator includes a rotor having 4n (n is a positive integer) permanent magnet poles disposed in a circumferential direction of the rotor to have circumferential gap S between adjoining poles and a stator having a stator core with 3n teeth and a plurality of coils wound around the teeth. The stator core includes a pair of core end plates disposed opposite axial ends of the stator core and a laminate core disposed between the core end plates. Each core end plate has a circumferential width C at portions opposite the permanent magnet poles, and the gap and the width C has the following relationship: $S+4 \geqq C \geqq S-1$.

The above structure is effective to reduce temperature rise of the stator core.

In the above permanent magnet type generator, each core end plate preferably has upright flange portion at portions of the stator opposite the permanent magnet poles. Preferably, the stator core has chamfered corners at portions around which the coils are wound. Further, each permanent magnet poles may include a rare-earth permanent magnet. The upright flange portion may have a rectangular shape. The upright flange portion may be integrated with the core end plate. The upright flange portions is arranged to make the axial length of the stator correspond to an axial length of the permanent magnet poles. More preferably, the circumferential width of the upright flange portions is 3 mm or more.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

A preferred embodiment according to the present invention and some modifications of the preferred embodiment will be described with reference to the appended drawings.

Figure 1:
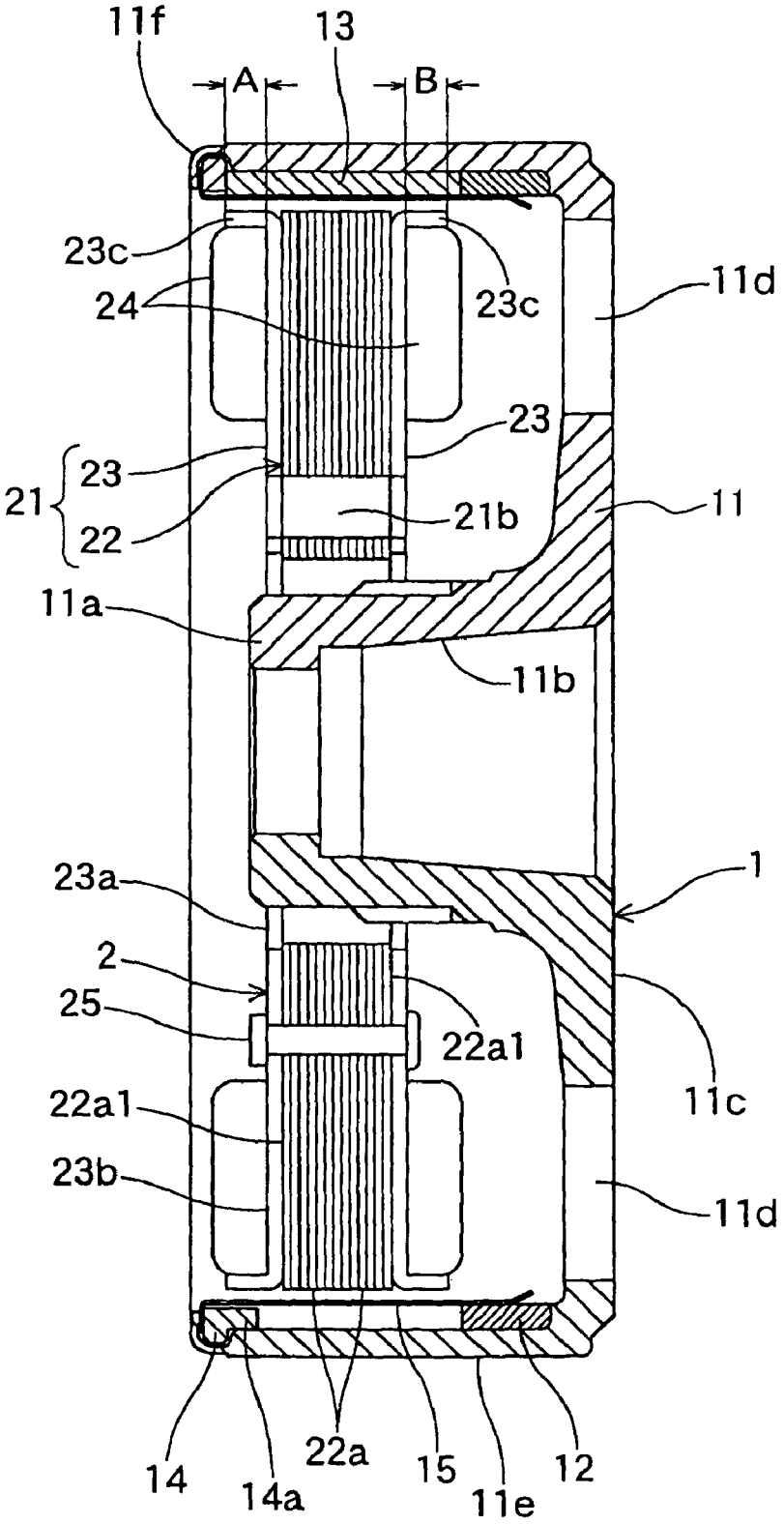
FIG. 1 is a cross-sectional side view of a permanent magnet type generator according to a preferred embodiment of the invention.
Figure 2A:
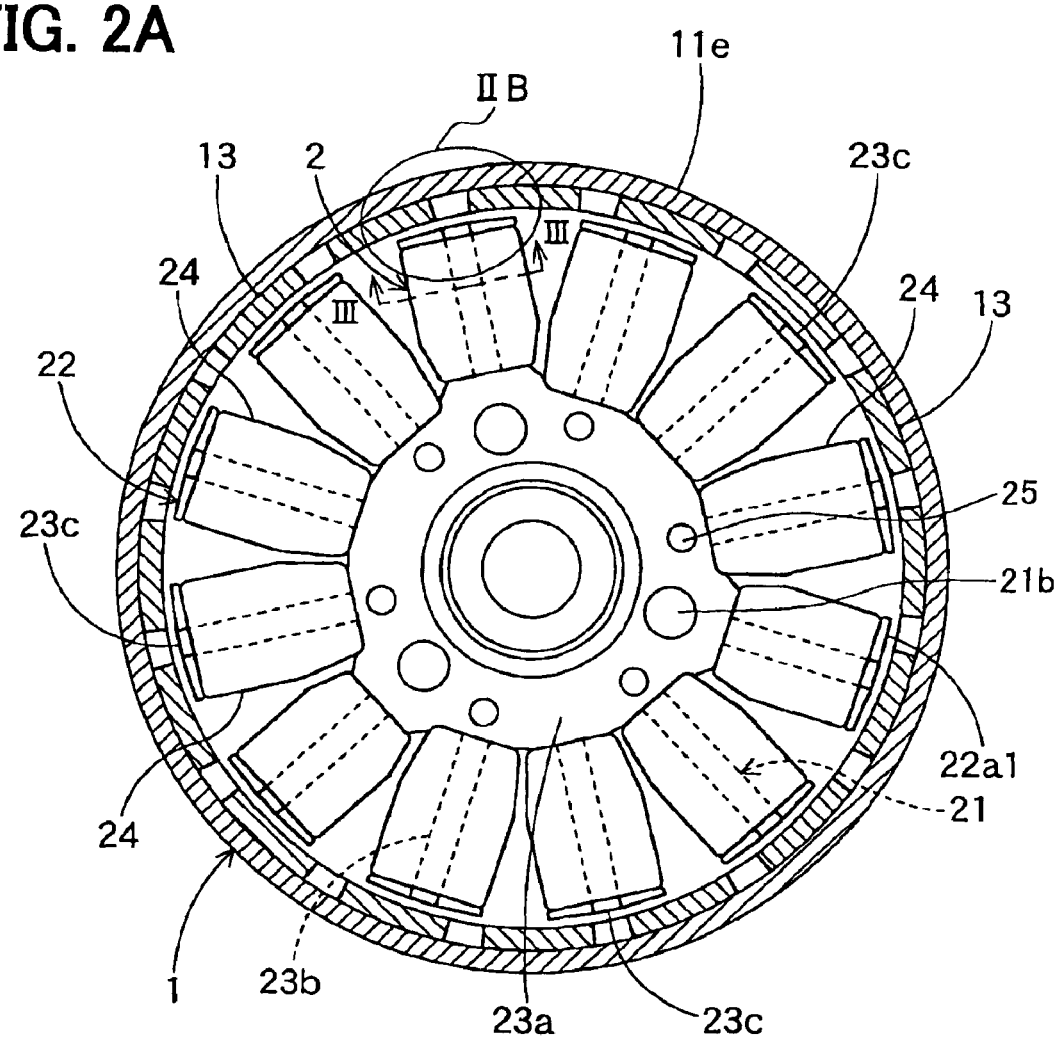
FIG. 2A is a cross-sectional front view of the permanent type generator shown in FIG. 1.

As shown in FIGS. 1 and 2A, a permanent magnet type generator includes a rotor 1 to be fixed to a crankshaft of an engine, a stator 2 disposed inside the rotor 1 and fixed to an engine cover. The rotor has 16 or 4n magnetic poles (n is a positive integer, e.g. 4), and the stator has 12 or 3n teeth.

The rotor 1 is comprised of a hot forged rotary magnetic member 11, a nonmagnetic ring spacer 12, 4n rare-earth permanent magnets 13, a ring-shaped magnet case 14 and a magnet protection ring 15.

The rotary magnetic member 11 includes a center boss 11a, an end surface 11c, a cylindrical yoke portion 11e and curled end portion 11f. The center boss 11a has a tapered surface so that the rotor 1 can be fixed to an engine crankshaft by a bolt via the tapered surface 11b. The end surface 11c has a plurality of cooling air windows 11d.

The ring spacer 12 and the 4n (here, n is 4) permanent magnets 13 are disposed on the inside surface of the yoke portion lie. The ring-shaped magnet case 14 has 16 (sixteen) projections 14a to space apart the permanent magnets 13 one from another at equal intervals in the circumferential direction of the yoke portion 11e. The magnet protection ring 15 is made of a stainless steel plate and covers the permanent magnets. One end of the protection ring 15 is fixed to the rotary magnetic member 11 by the curled end portion 11f.

The stator 2 is comprised of a stator core 21 and 12 (twelve) of coils 24. The stator core 21 has twelve teeth and three through holes 21b and is comprised of a laminate core 22 and a pair of core end plates 23 each of which is made of an iron sheet and is as thick as 1.2 mm. The laminate core 22 is comprised of a plurality of thin core sheets each of which is made of a soft iron sheet and is as thick as 0.5 mm. The core end plates 23 and the core sheets are fixed by a plurality of rivets 25. The surface of the stator core 21 is covered with an epoxy-resin insulation coating 26, and the coils 24 are respectively wound around the teeth of the stator core 21. The stator 2 is fixed to an engine cover by a plurality of through bolts (not shown) via the through holes 21b.

Figure 6:
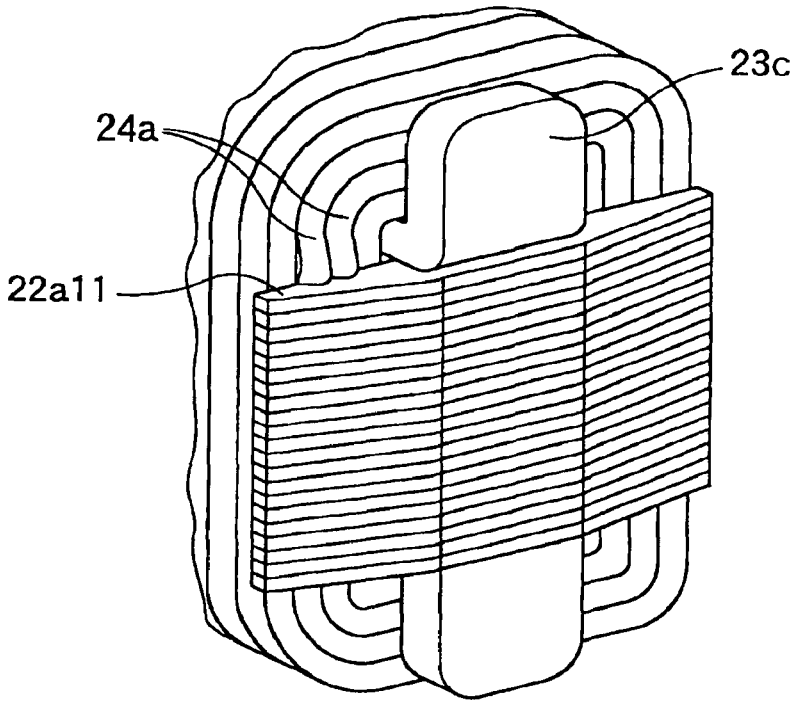
FIG. 6 is a perspective view of a portion of a stator coil of the permanent magnet type generator according to the preferred embodiment.
Figure 7:
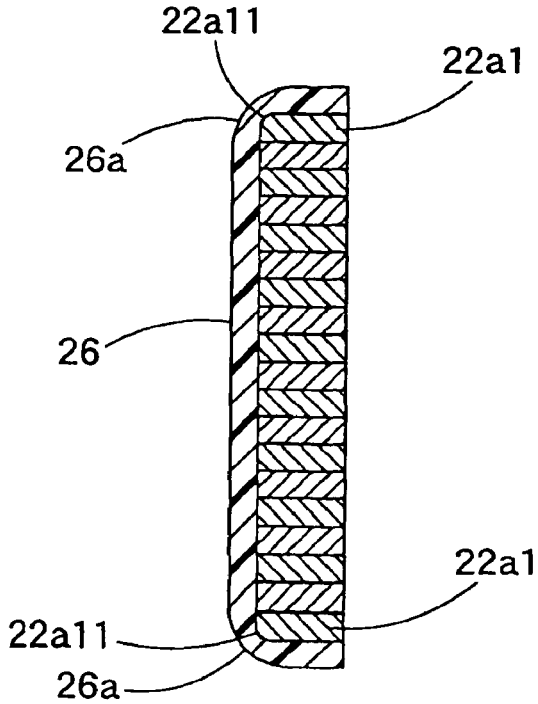
FIG. 7 is a cross-sectional view of the portion of the stator core shown in FIG. 5 covered with an insulation coating.

Each core end plate 23 has twelve teeth 23b, each of which has an axially extending upright flange portion 23c at the peripheral surface of the stator core 21 and chamfered corners 23a1, 23b1 and 23c1 where the coils 24 are in contact therewith. The laminate core sheet 22 also has chamfered corners 22a1, 22a11 where the coils 24 are in contact therewith. Each of the chamfered corners 23a1, 23b1, 23c1, 22a11 has a 0.2 mm or more radius, so that the insulation coating is effectively prevented from thinning at the corners as shown in FIG. 7. Therefore, the coils 24 are not damaged even if portions 24a of the coil 24 are pressed against the chamfered corners of the stator core 22, as shown in FIG. 6.

Figure 8A:
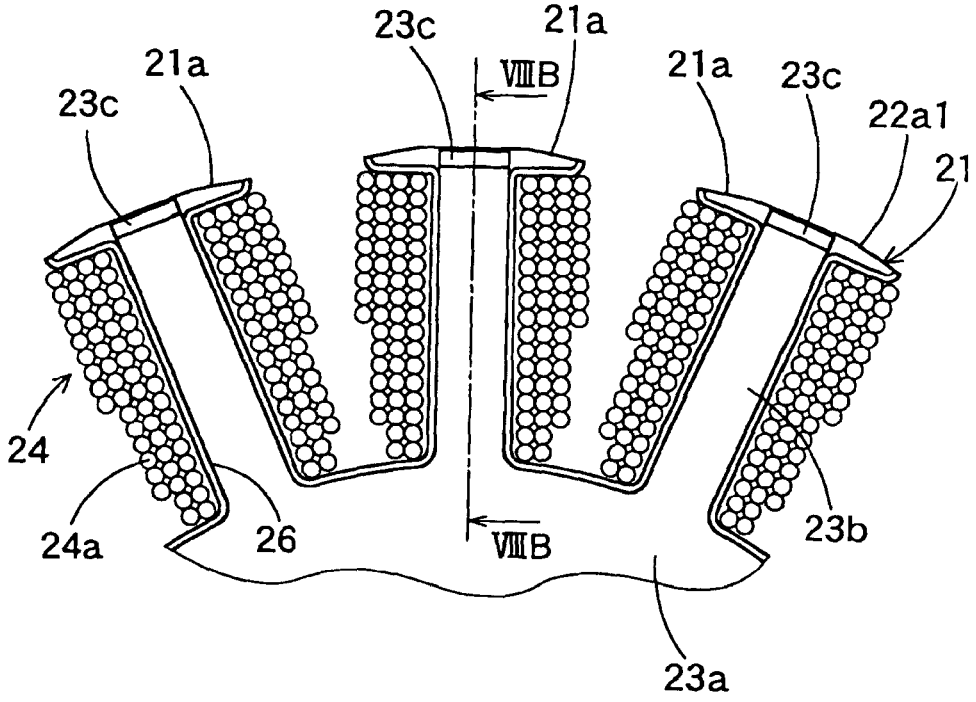
FIG. 8A is a cross-sectional schematic front view of a portion of a stator of the permanent magnet type generator according to the preferred embodiment and FIG. 8B is a cross-sectional schematic side view of a portion of the stator.
Figure 8B:
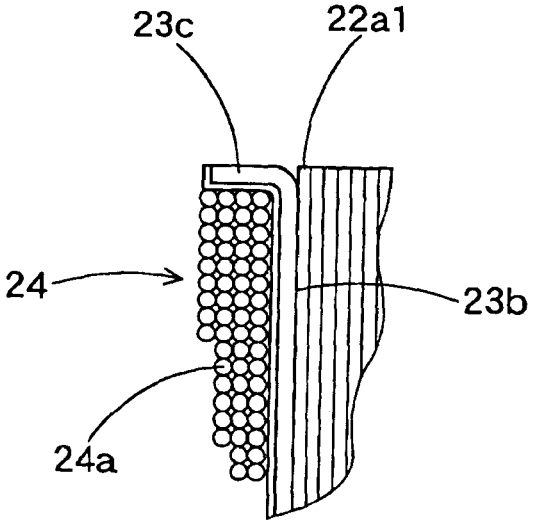
Figure 14:
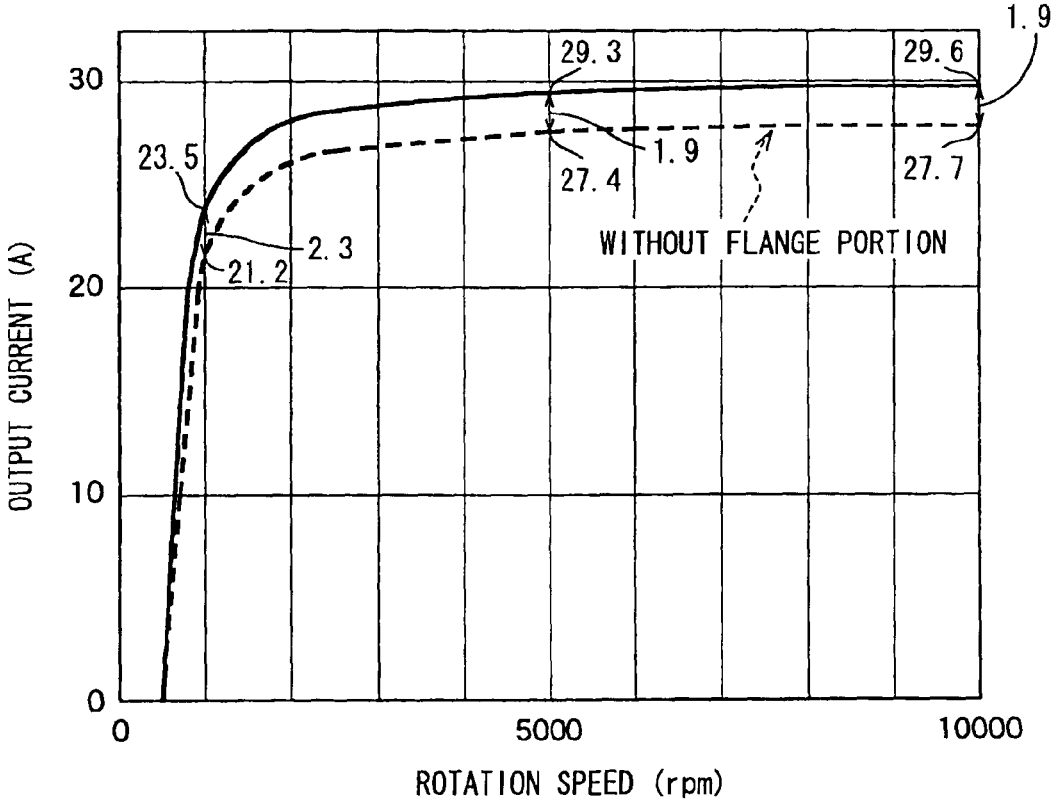
FIG. 14 is a graph showing an output current characteristic of the permanent magnet type generator according to the preferred embodiment.
Figure 15:
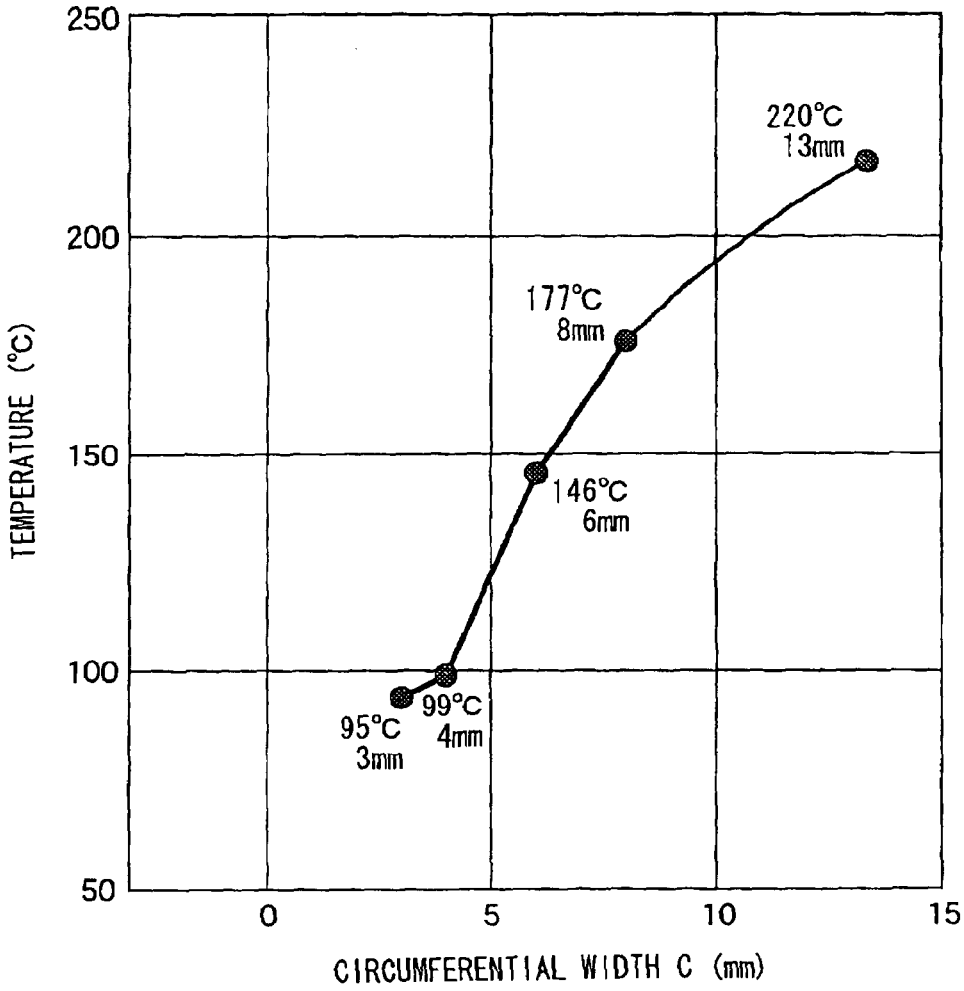
FIG. 15 is a graph comparing temperature of different core end plates.

The upright flange portions 23c on one side of the stator core 21 extend in an axial direction opposite to the upright flange 23c on the other side so that axial length of the peripheral surface of the stator core can correspond to the axial length of the permanent magnets 13. Therefore, the flange portions 23c conduct or introduce a sufficient amount of effective magnetic flux from the permanent magnets 13 and hold coils of a large number of turns (i.e. T), as shown in FIGS. 8A and 8B. That is, the generator according to the preferred embodiment of the invention can generate much more electric power than a generator that has no upright flange, as shown in FIG. 14. It should be noted that the increase in the electric power of the generator according to the preferred embodiment is more significant in the lower speed range.

Figure 2B:
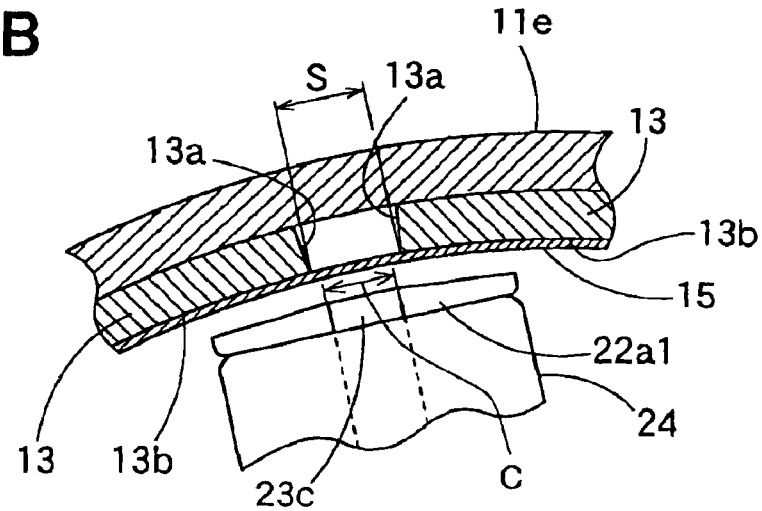
FIG. 2B is an enlarged view of portion IIB of FIG. 2A.
Figure 3:
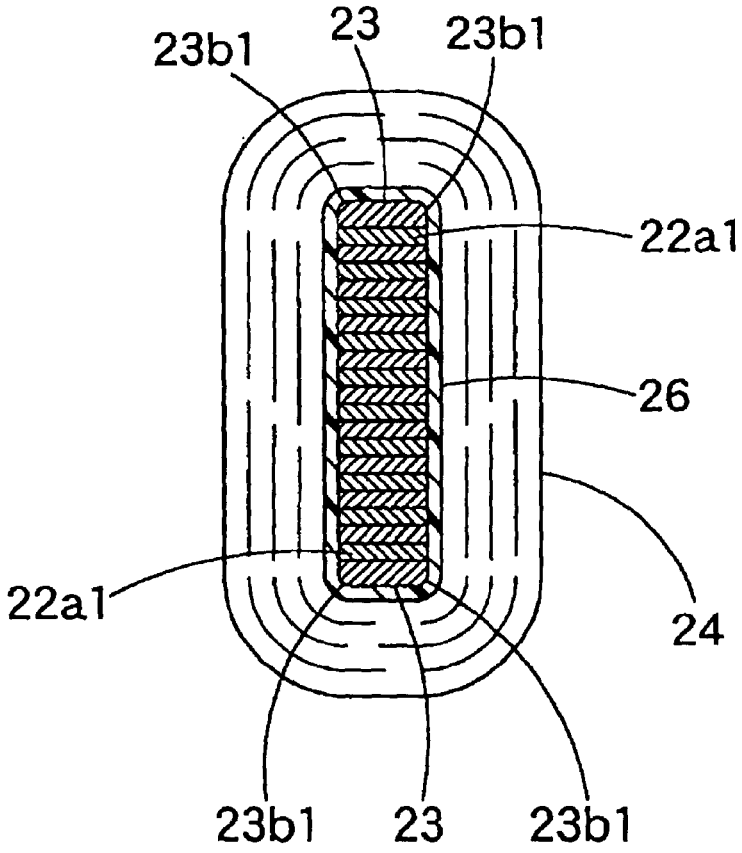
FIG. 3 is a cross-sectional view of a portion of the permanent magnet type generator shown in FIG. 2B cut along line III-III.

As shown in FIGS. 2a and 2B, each upright flange portions 23c has a circumferential width C that is more than 3 mm and less than 8 mm if the distance of the circumferential gap S between adjacent permanent magnets 13 at their inside surfaces is 4 mm. It was found in a test, as shown in FIG. 16, that the temperature rise of the upright flange portion 23c can be reduced if the circumferential width C of the upright flange portion 23c and the minimum distance of the circumferential gap S has the following relationship.

$$S+4 \geqq C \geqq S-1$$

Figure 4:
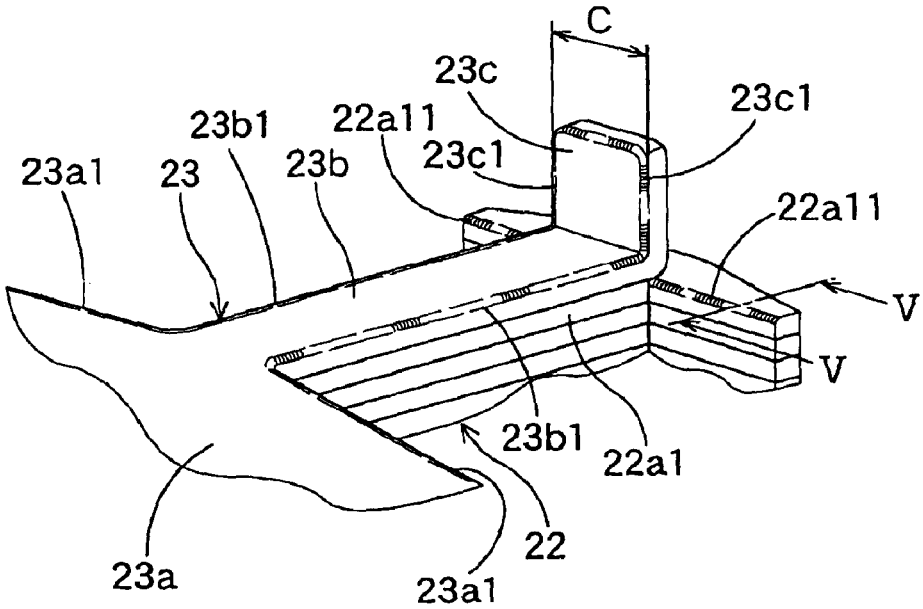
FIG. 4 is a perspective view of a portion of a stator core of the permanent magnet type generator according to the preferred embodiment.
Figure 5:
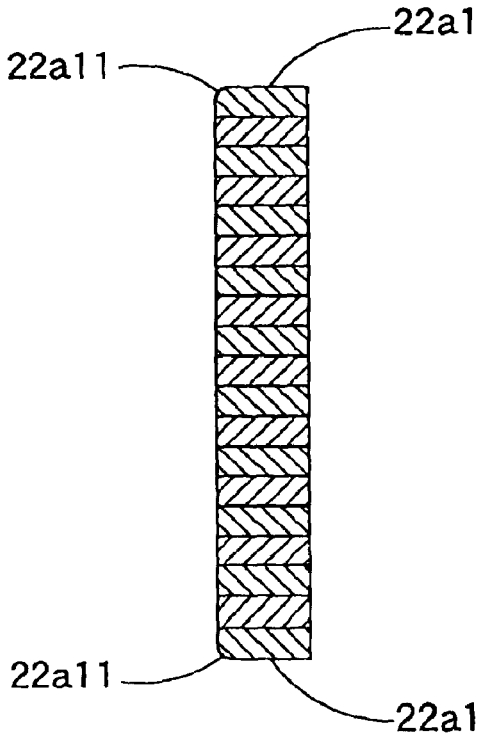
FIG. 5 is a cross-sectional view of a portion of the stator core shown in FIG. 4 cut along line V-V.
Figure 9:
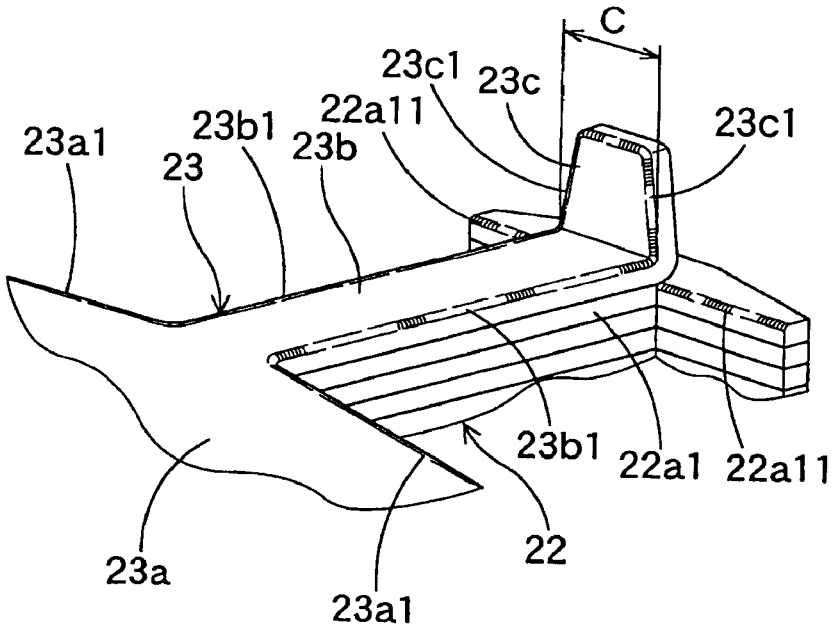
FIG. 9 is a perspective view of a portion of a modified stator core of the permanent magnet type generator according to the preferred embodiment.
Figure 10:
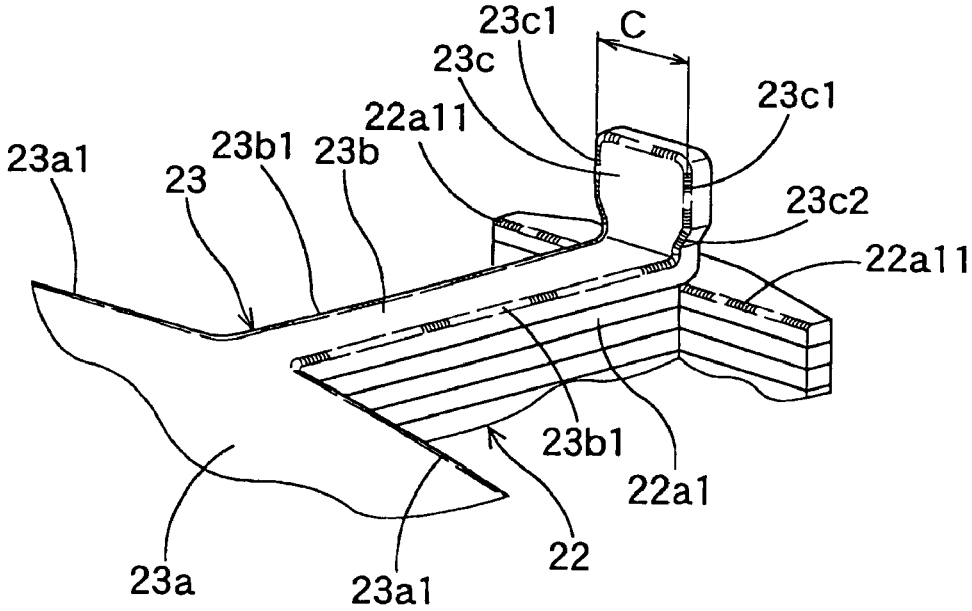
FIG. 10 is a perspective view of a portion of another modified stator core of the permanent magnet type generator according to the preferred embodiment.
Figure 11:
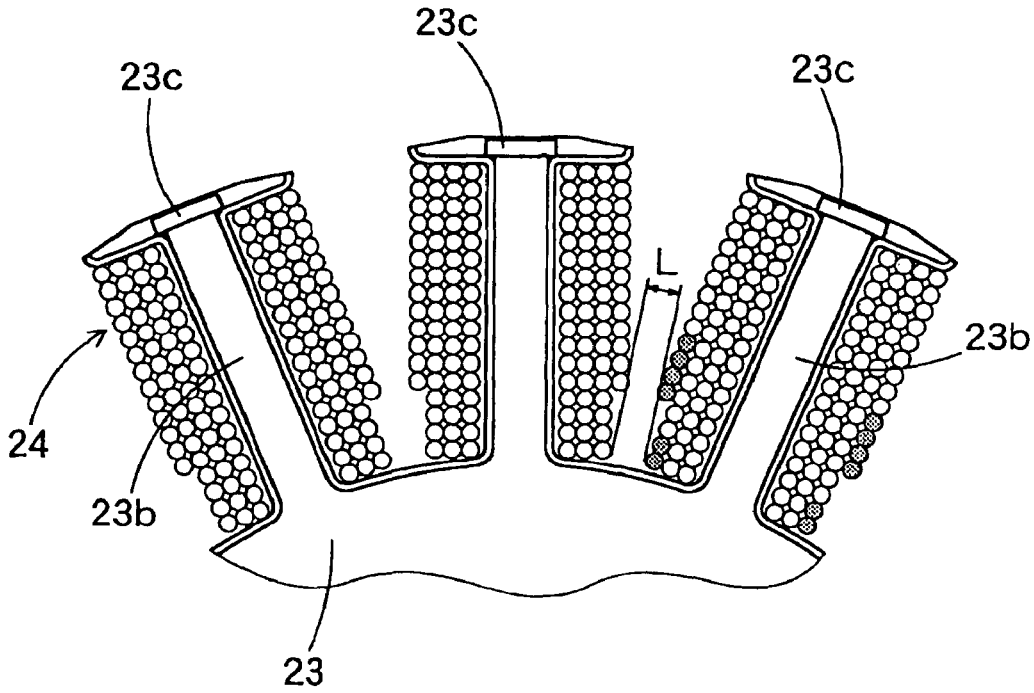
FIG. 11 is a perspective view of a portion of the stator core shown in FIG. 10 around which a stator coil is wound.

As shown in FIG. 9, the upright flange portion 23c may have a different shape, such as a trapezoidal shape. As shown in FIG. 10, the tooth width of the core end plate 23 may be narrower than the width of the upright flange portion 23c. Because it is possible to provide a suitable gap L between adjoining coils over a comparatively longer radial length than the embodiment shown in FIGS. 4 and 8, the number of the coil turns can be increased as shown in FIG. 11, so that the output power at a lower speed range can be increased.

Figure 12:
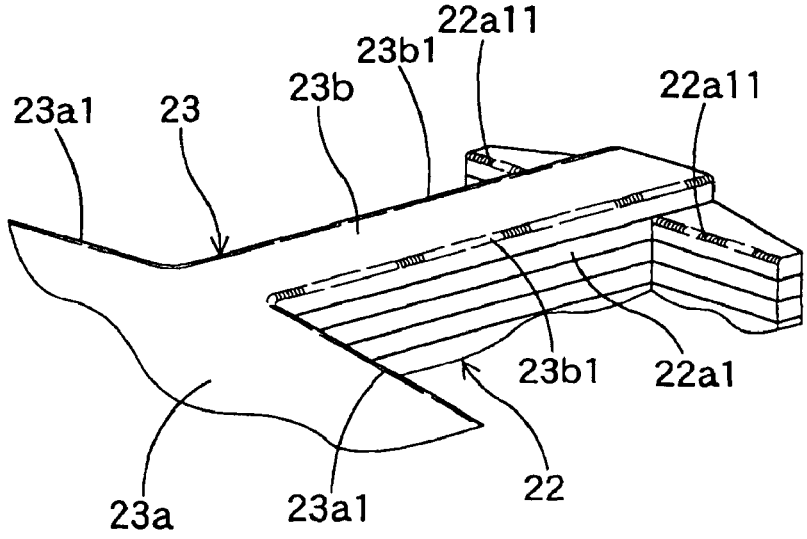
FIG. 12 is a perspective view of a portion of a modified stator core of the permanent magnet type generator according to the preferred embodiment.

As shown in FIG. 12, the upright flange portion 23c can be removed if only a small amount of the output power is necessary.

Figure 13:
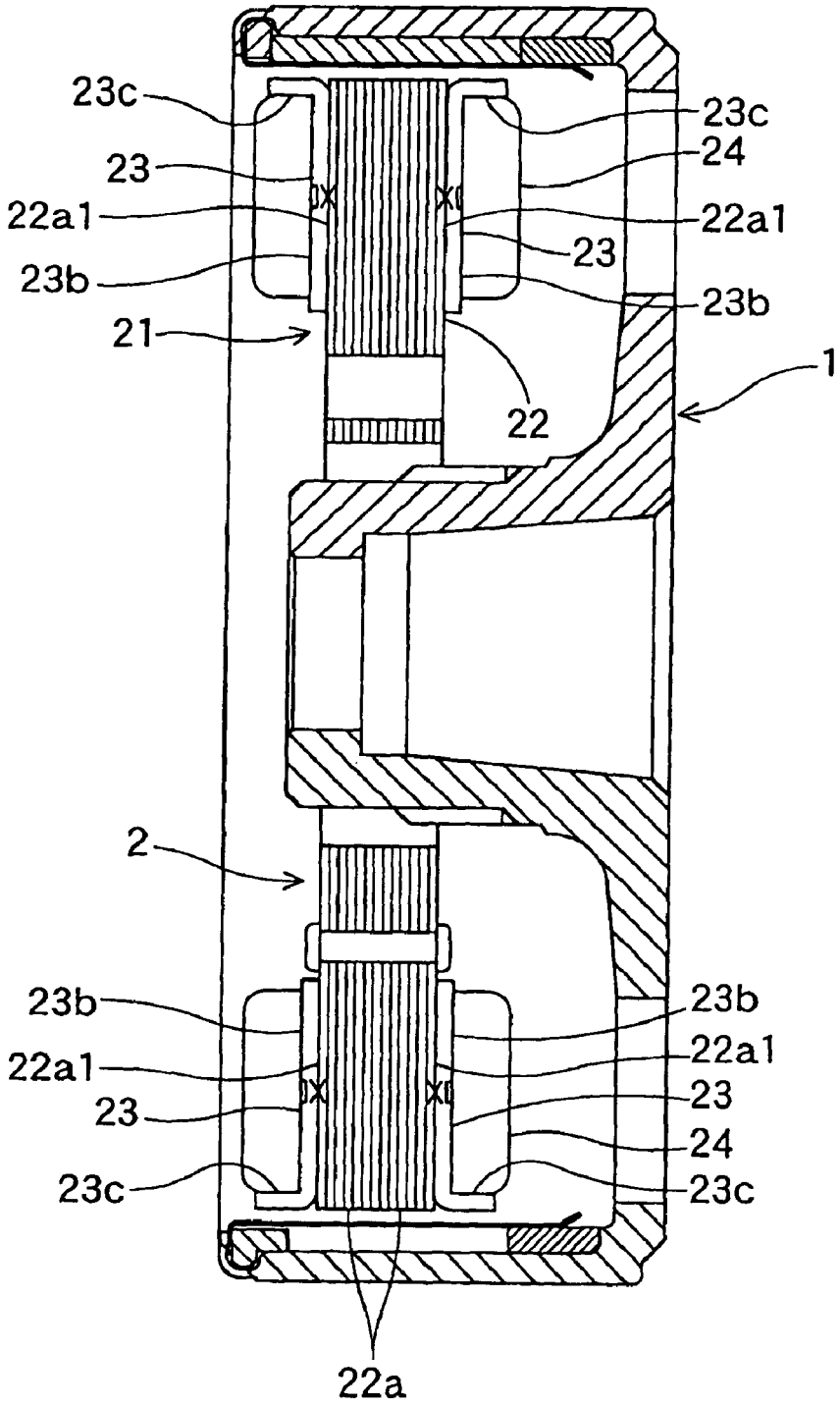
FIG. 13 is a cross-sectional side view of a modified permanent magnet type generator according to the preferred embodiment of the invention.

As shown in FIG. 13, the stator core 21 may have different core end plates 23 from those shown in FIGS. 1 and 2A. That is, the portion of the core end plates 23 radially inside the portions around which the coils are wound is removed. The upright flange portions 23c can be made separately, so that they are welded to the teeth of the stator core or the core end plates.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A permanent magnet type generator comprising:

a rotor having 4n permanent magnet poles disposed in a circumferential direction of said rotor to have circumferential gap S *mm* between adjoining poles; and a stator including a stator core having 3n teeth, a plurality of coils wound around said teeth, said stator core including a pair of core end plates disposed opposite axial ends of said stator core and a laminate core disposed between said core end plates, wherein:

n is a positive integer;

each said core end plate has a circumferential width C *mm* at portions opposite said permanent magnet poles; and said gap *S* and said width C has the following relationship:

$$S+4\ mm \geqq C \geqq S-1\ mm.$$

2. The permanent magnet type generator as claimed in claim 1, wherein each said core end plate has upright flange portion at portions of said stator opposite said permanent magnet poles.

3. The permanent magnet type generator as claimed in claim 1, wherein said stator core has chamfered corners at portions around which said coils are wound.

4. The permanent magnet type generator as claimed in claim 1, wherein each said permanent magnet poles comprises a rare-earth permanent magnet.

5. The permanent magnet type generator as claimed in claim 2, wherein said upright flange portion has a rectangular shape.

6. The permanent magnet type generator as claimed in claim 2, wherein said upright flange portion is integrated with said core end plate.

7. The permanent magnet type generator as claimed in claim 2, wherein said upright flange portions make the axial length of said stator correspond to an axial length of said permanent magnet poles.

8. The permanent magnet type generator as claimed in claim 2, wherein the circumferential width of said upright flange portions is 3 mm or more.

9. The permanent magnet type generator as claimed in claim 2, wherein n is 4.

10. The permanent magnet type generator as claimed in claim 2, wherein said stator core has chamfered corners whose radius is 0.2 mm or more at portions with which said coils are in contact.

*11. A permanent magnet type generator comprising:*

*a rotor having 4n permanent magnet poles, wherein n is a positive integer, the poles disposed circumferentially around the rotor and arranged with a circumferential gap of S mm between adjacent poles; and*

*a stator including:*

*a stator core having 3n teeth, a plurality of coils wound around the teeth;*

*a pair of core end plates disposed at opposite axial ends of the stator core, the core end plates having an upright flange portion located opposite the permanent magnet poles; and*

*a laminate core disposed between the core end plates, wherein:*

*each core end plate has a circumferential width C mm at portions opposite the permanent magnet poles; and*

*the circumferential gap S and the circumferential width C satisfy the following relationship:*

$$S+4\ mm \geqq C \geqq 3\ mm.$$

*12. The permanent magnet type generator as claimed in claim 1, wherein said stator core has chamfered corners at portions around which said coils are wound.*

*13. The permanent magnet type generator as claimed in claim 1, wherein each said permanent magnet poles comprises a rare-earth permanent magnet.*

*14. The permanent magnet type generator as claimed in claim 2, wherein said upright flange portion has a rectangular shape.*

*15. The permanent magnet type generator as claimed in claim 2, wherein said upright flange portion is integrated with said core end plate.*

*16. The permanent magnet type generator as claimed in claim 2, wherein said upright flange portions make the axial length of said stator correspond to an axial length of said permanent magnet poles.*

*17. The permanent magnet type generator as claimed in claim 2, wherein n is 4.*

*18. The permanent magnet type generator as claimed in claim 2, wherein said stator core has chamfered corners whose radius is 0.2 mm or more at portions with which said coils are in contact.*

* * * * *